United States Patent Office 3,519,662
Patented July 7, 1970

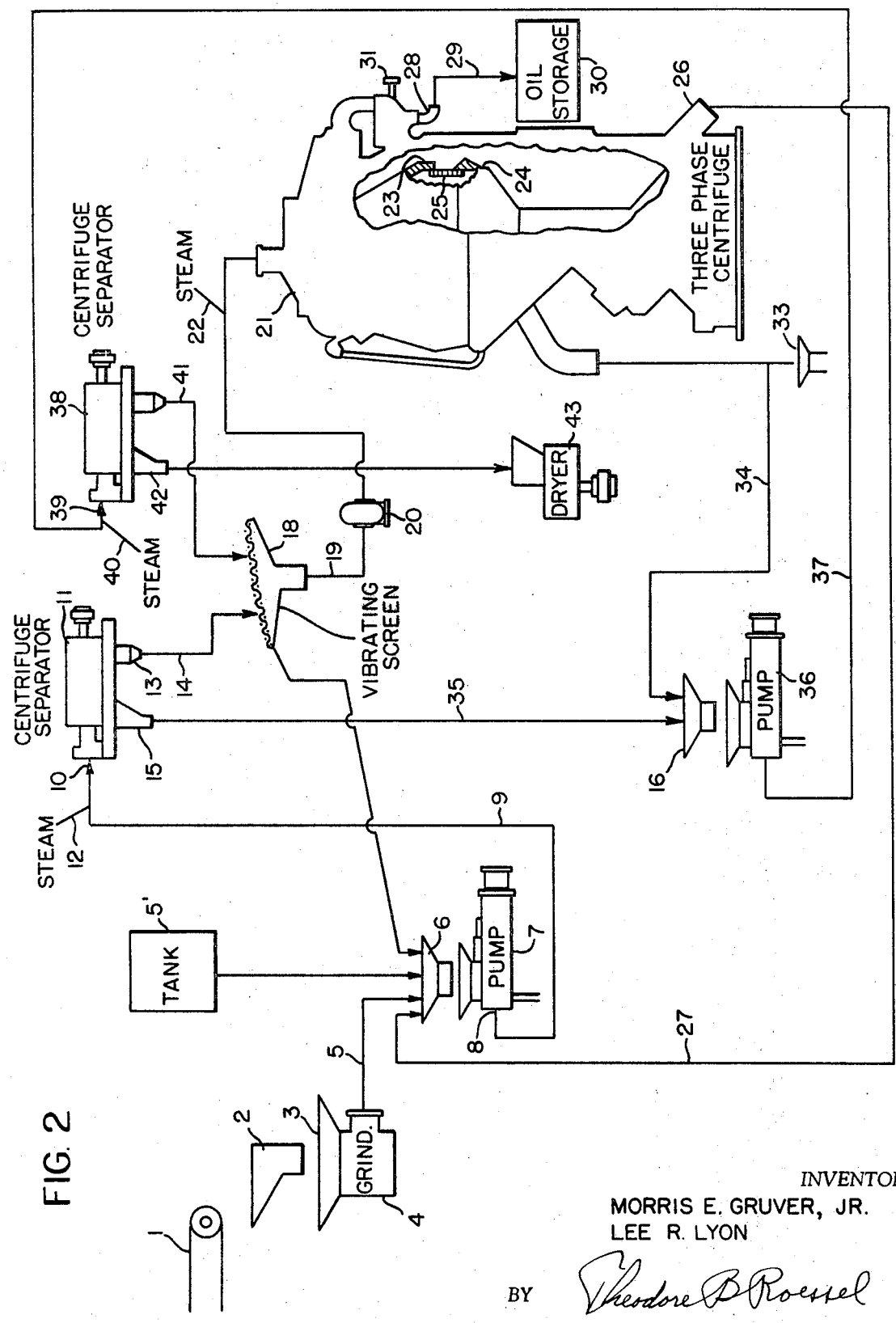

3,519,662
FAT SEPARATION PROCESS
Morris E. Gruver, Jr., Rochester, N.Y., and Lee R. Lyon, Kansas City, Mo., assignors to Sybron Corporation, Rochester, N.Y., a corporation of New York and Lycoil, Inc., North Kansas City, Mo., a corporation of Missouri
Continuation-in-part of applications Ser. No. 545,588, Apr. 27, 1966, and Ser. No. 586,214, Oct. 12, 1966. This application Mar. 21, 1969, Ser. No. 809,111
Int. Cl. C11b 1/16; C07g 7/00; R04b 15/02
U.S. Cl. 260—412.7
10 Claims

ABSTRACT OF THE DISCLOSURE

The invention is an improvement in the process of continuous rendering and separation of fats and oils from animal tissue wherein the animal tissues are acidified prior to separation into clarified fat products, stickwater, protein and associated tissue so as to provide a stickwater effluent having a critical pH between 4.1 and 5.8 and a fat and oil content of less than about 0.4% by weight.

This is a continuation-in-part of application Ser. No. 545,588 filed Apr. 27, 1966, by Morris E. Gruver, Jr., and application Ser. No. 586,214, filed Oct. 12, 1966, by Lee R. Lyon.

This invention relates to a method for reducing the fat content of the waste water effluent in fat separation processes. More particularly, this invention relates to reducing fat losses in fat separation processes by reducing the fat content of the waste water separated thereby, through a selective addition of acidic substances to mixtures of fats, water and associated animal tissues prior to their separation into their respective components such that the separated water has a pH between about 4.1 and 5.8. The invention also relates to the processing of raw materials from animal, poultry, fish and the like for recovery and separating protein solids and fats therefrom in a relatively uncooked state.

Rendering animal tissues permits recovery of much of the economically valuable fats and oils. In some rendering, heat may be used to break down fat and oil bearing tissues, liberating the fats and oils in a form which permits their separation and recovery from associated protein, water and other tissues. Methods used to effect separation and recovery often employ a final separation step to isolate and recover the fats and oils as a clarified product. Typical of such methods are those exhaustively described in the publications listed in the following table, which descriptions are included herein by reference as disclosing the state of the art.

"Centrifacts," Oct. 1965, No. 5, pp. 1 and 2, published by Westfalia Separator.
J. Amer. Oil Chemists' Soc., 26, pp. 575–80 (1949).
J. Amer. Oil Chemists' Soc., 33, pp. 471–473 (1956).
J. Amer. Oil Chemists' Soc., 36, pp. 70–73 (1959).
U.S. Pats. 2,423,102; 2,748,152; 2,823,215; 3,020,160; 3,078,165; 3,078,287; 3,141,774; 3,171,847; and 3,222,384.

One major difficulty encountered with such methods is the loss of the fats and oils that are carried along with the separated waste water, called hereinafter "stickwater." Depending upon the number and types of operations performed prior to the final separation and clarification step, the separated stickwater has unseparated fats and oils carried along with at amounting to from as much as about 50% to as little as about 0.5% of its total weight. This represents considerable loss of valuable fats and oils and so provides a distinct economic disadvantage in the use of prior art separation processes. Further, the presence of from 0.5% to 50% by weight of fats and oils in a water waste, which latter is normally discharged into public waters, will often substantially increase the biological oxygen demand (BOD) and chemical oxygen demand (COD) of the waste water beyond permissible limits for such discharge. To reduce the BOD and COD to permissible limits the art employs extensive sewage treatment which represents aggravated and costly economic problems. It is to the substantial remedy of these disadvantages and problems that this invention is directed.

In the processing of poultry, fish, animal or like fat and protein material to separate and recover fat and solids therefrom, it is important that as small an amount of fat remain in the dry solids as is economical for the reason that often the fat is of higher value than the dry solids and the dry solids are usually sold on the basis of their protein content so while the fat may add weight it does not add value to such solids.

An important object of this invention is to provide a separation process improvement which substantially reduces the amount of fats and oils that would otherwise be carried over into stickwater effluent from the separation of rendered fats and oils, water and associated animal tissues.

Another object of this invention is to provide a separation process improvement which reduces the loss of valuable fats and oils that otherwise would be occasioned in the separation of rendered fats and oils, water and associated animal tissues by a selective addition of acid prior to such separation, such that the subsequently separated stickwater has a pH of 4.1 to 5.8.

A further object of this invention is to provide a separation process improvement which prevents excessive processing difficulties and a low yield of valuable fats and oils due thereto through selective acidification of mixtures of fats and oils, water and associated animal tissues prior to their separation such that the subsequently separated stickwater has a pH of 4.1 to 5.8.

Further objects of the present invention are to provide for the processing of raw animal, fowl, and fish material and the like to recover and separate protein solids and fat in which the screw cookers, presses, and hashers used in prior systems are eliminated; to provide such a process wherein the material is in a raw state and is reduced to relatively large pieces such as will pass through a one inch screen and then subjected to heat to reduce viscosity of the fat, but said heat and time of application being insufficient to cook or render the material; to provide such a process wherein the application of heat to the material is in a flow stream and is controlled and limited to a minimum time interval and at selected places to reduce loss of protein in the waste water discharged to a sewer; to provide such a process wherein the pH of the liquid mass is adjusted and controlled to a range of approximately 4.0 to 6.0 to reduce solubility of the protein in water and reduce tendency of the fats to become emulsified thereby facilitating separation and recovery; to provide such a process wherein raw protein and fat containing material is reduced in size and a suitable material added to adjust the pH and retard emulsification and the treated material is moved to a centrifuge and heated to raise the temperature of the mass to approximately 180° F. to 205° F. adjacent the inlet of the centrifuge whereby the time at which the mass is at said temperature is reduced to a minimum; to provide such a process wherein the treated mixture of the processed material is centrifuged to displace fat from the cells and then separate from the wet solids the fat and excess water to obtain a wet cake which may be further processed and centrifuged to separate fat therefrom and obtain a cake that may be dried to a low fat content solid; to provide such a process wherein the liquids from the centrifuge are passed through a screen with solids removed being recycled or processed and the liquid being further centrifuged to separate and recover fat therefrom with the water phase separated from the fat being used in reprocessing of the cake from the first centrifuge and the sludge being recycled through the process for maximum recovery of fats and a minimum of fat in the recovered solids in the form of the cake; to provide such a process in which the time of heating is low and materials are processed and recycled for maximum recovery and use in a manner that is efficient and economical in the recovery of the usable materials.

Yet other substantial benefits and further desirable objects of the present invention are made evident by, or are inherent in the drawing, descriptions, examples and definitions given herein.

FIG. 2 is a schematic flow diagram showing the various treating steps to which the raw animal, fowl, fish, and the like is subjected in recovering and separating fats and solid materials therefrom.

Figure 1:
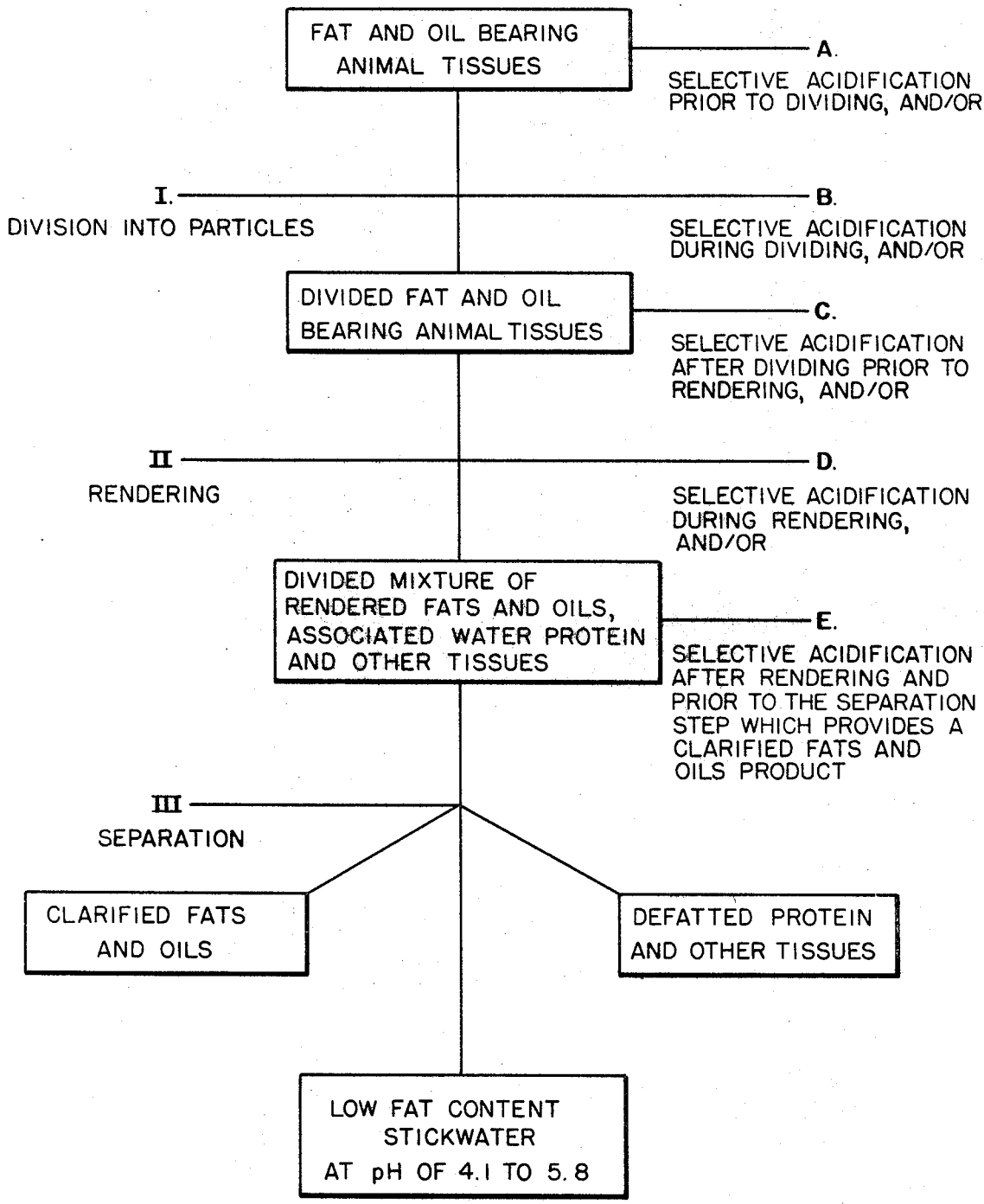
FIG. 1 is a diagram of the general process pursued according to the teachings of this invention.

It is now discovered that substantial remedy of the foregoing difficulties and satisfaction of the present objects are attained by a selective acidification of mixture of fats and oils, water and associated animal tissues prior to their separation, such that upon their final separation the water so separated is within a critical pH range of between about 4.1 and 5.8. If acid is unselectively added in excess of that required to lower the pH to 4.1, it has now been found that the later separated fats and oils are obtained in very low yield and substantial separation processing difficulties are incurred. If no acid is added, or if acid is unselectively added in amounts insufficient to lower the pH of the separated stickwater to at least 5.8, the stickwater effluent from the final separation step will contain substantial quantities of unseparated fats and oils. Thus no or unselective acidification not only provides substantial economic loss, not only from the points of poor recovery of valuable fats and oils and substantial processing difficulties incurred, but also from the point of the required added expense involved in intensively treating stickwater to reduce high BOD and COD to within acceptable limits for sewage wastes, prior to their discharge as a process effluent into public waters, such as streams and the like.

There are diverse processes for fat rendering and its separation from water and associated animal tissues, such as those illustrated in the aforementioned prior art references. The present invention is applicable to all such processes which contain a final separation step, such as centrifuging, or settling coupled with pressure discharge and/or decantation and/or syphoning, which may be used to effect the final separation of the fats and oils as a clarified product from waste water and associated animal tissues. Many of the references listed deal with "wet" rendering processes, and involve centrifugation as the final separation step to provide a clarified fat and oil product. However, the invention is not restricted to "wet" type rendering and centrifuging separation processes, per se. The invention also may be used to advantage in "dry" type rendering processes, wherein the fat and oil to be clarified may subsequently undergo a final separation step, such as centrifuging, or settling with pressure discharge and/or decantation and/or syphoning, and where water is present prior to such separation, say due to its incomplete removal during the cooking step that is required in dry rendering, or present due to the deliberate addition of water such as is disclosed by M. E. Gruver in the pending U.S. patent application 233,675, filed on Oct. 29, 1962, for "Method for Clarifying Fats and Oils," now Pat. No. 3,261,546, issued July 19, 1966.

The invention improvement is illustrated in FIG. 1 which diagrams the general process pursued according to the teachings of this invention for separating a clarified fat and oil product of good quality and high yield from a stickwater of acceptably reduced fat and oil content. Selective acidification is made as shown at either one or more of points A, B, C, D and/or E, all prior to step III, that of final separation, or "polishing" as it is sometimes known in the art, thus to provide upon final separation a clarified fat and oil product of good quality in high yield and a waste stickwater having a substantially reduced fat content and a pH between about 4.1 and 5.8.

The following examples present embodiments of the process improvement of this invention to illustrate its practice, but are not to be construed as defining the invention or as imposing limitations upon its scope.

EXAMPLE 1

Ground pork fat is processed in a prior art manner according to the example given in U.S. Pat. 2,823,215, with no acidification, in a continuous comminution, rendering, hydrolysis of protein, and centrifugal separation of the rendered comminuted products into three streams, namely, clarified fat, valve operating fat which is recycled, and valve sludge comprised of solids, water, and an emulsion which contains fats and oils. The fats and oils present in the valve sludge are then further separated and recovered by dry rendering the sludge.

In like manner, the process of the example given in U.S. Pat. 2,823,215 is repeated, however, just before comminution in the Fitzpatrick comminutor and the subsequent final centrifuging, an effective amount of dilute aqueous sulfuric acid is selectively added to the liquid effluent from the first centrifuging according to the teachings of this invention, such that the aqueous portion of the valve sludge obtained after final separation as a pH of between 4.1 and 5.8 and is of such low fat content as to obviate the need for dry rendering. There is no evidence of substantial amounts of fat or emulsion present in the stickwater supernatant liquid when the acidified valve sludge is permitted to stand in a settling tank, and thus the stickwater is separated by decantation or syphoning from the settled solids and subjected to but ordinary rather than intensive sewage treatment prior to its discharge into public waters.

Elimination of the need to dry render to recover the otherwise waste fats, makes the selective acidification process of this invention far more economical to practice than the process illustrated by the example of U.S. Pat. 2,823,215. Further, the fat which would otherwise have been carried along into the valve sludge by the process illustrated in U.S. Pat. 2,823,215, is largely forced by the present acidification process into the stream of clarified fats and oils and so recovered as such. This fat is of a high quality that is not endangered by the otherwise required prolonged cooking treatment at high temperatures that is characteristic of the dry rendering taught by the example in U.S. Pat. 2,823,215.

EXAMPLE 2

Ground pork fat is processed according to the teachings of Example 1 of U.S. Pat. 2,748,152. In order to obtain a clean stickwater, the heated ground fat after rendering is continuously delivered, first, to a scroll centrifuge, such as the types disclosed in U.S. Pats. 3,061,181 and 3,096,282 among others, which divides the rendered material into two phases, (1) a water-oil emulsion and (2) insoluble protein particles. The water-oil emulsion is then fed to a second centrifuge, of the self-cleaning type, such as is disclosed in FIG. 2 of U.S. Pat. 2,823,215 and in U.S. Pats. 2,679,964 and 2,703,676, which divides the emulsion into three streams (1) clean dry oil, (2) water-containing oil emulsion and (3) fine meat particles suspended in water containing some oil. The water-containing oil of the second stream is fed into a third centrifuge of the self-cleaning type. Here it is separated in a polishing operation into (1) relatively clean stickwater containing some small amount of oil and fine particles of protein, and (2) oil containing some small amount of water. The oil containing some small amount of water (2) is returned for a fourth centrifuging to the second centrifuge for separation into clean dry oil, and stickwater.

In similar manner to that of Example 1 of U.S. Pat. 2,748,152, the rendered ground and heated pork fat is continuously fed to a scroll centrifuge. During such feed, dilute hydrochloric acid (muriatic acid) is selectively metered according to the process of this invention into and mixed with the rendered fat such that the rendered material in the scroll centrifuge forms (1) two liquid phases, one of oil with some water and the other of water with some oil at a pH of about 5, and (2) insoluble protein particles. The two liquid phases are separated from the insoluble protein particles by the scroll centrifuge. The two liquid phases are then fed to a second centrifuge of the self-cleaning type, which divides and separates the two phases, both of which contain a fine suspension of solid protein particles carried along therewith, into three portions, (A) a clarified dry oil, (B) a protein sludge containing about 15% of its weight in oil, about 25% of its weight in fine protein particles and the remainder of water, which sludge upon drying is suitable for use as an animal feed, and (C) stickwater of pH of about 5.2 which contains less than about 0.4% of its weight in oil and thus needs no further processing for oil recovery.

Elimination of the need for a third centrifuging and a third centrifuge to obtain a dry oil from the second stream, that would otherwise be required by Example 1 of U.S. Pat. 2,748,152, makes the acidification process of this invention more economical to practice than that of the aforesaid prior art process. Other advantages here shown include eliminating the need to reseparate oil from water by returning the oil from (2) to the second centrifuge for a fourth centrifuging. The acidification process of this invention separates out a dry oil in the second centrifuging.

EXAMPLE 3

In similar manner to Example 2 above, the process taught in Example 3 of U.S. Pat. 2,748,152 using beef caul fat is pursued, however, after the first centrifuging by the scroll centrifuge, the water-oil emulsion stream containing suspended protein particles is selectively acidified with citric acid to a pH of about 4.1 and then is fed to a second centrifuge of the self-cleaning type, such as has been described. The second centrifuge divides and separates its feed into three portions, (1) a clarified dry oil suitable for oleo preparation, (2) a protein sludge that is suitable upon drying for use as an animal feed and (3) a clean stickwater of a pH of about 4.5 which contains less than 0.4% oil. A clarified oil with a fatty acid content less than 0.5% by weight is obtained.

EXAMPLE 4

The process embodiment disclosed in U.S. Pat. 3,171,847 is pursued. Following settling of the rendered materials to form three layers, (1) melted lard, (2) an emulsion of melted lard and water and (3) tank or stickwater, the layers are separated. The melted lard layer, which contains suspended protein particles, required centrifuging in a self-cleaning type centrifuge to be clarified. The emulsion layer has large amounts of otherwise waste lard present and is centrifuged twice to recover the lard and to provide stickwater effluent suitable for intensive waste treatment for ultimate discharge. The tank or stickwater layer also has considerable lard present and similarly must be further centrifuged to recover this lard, and intensively treated by waste digestion methods to make it suitable for discharge.

The foregoing process is repeated, however, prior to the settling of the rendered materials, dilute phosphoric acid is added thereto such that, upon settling, there is provided a melted lard layer, a tank water or stickwater layer with a pH of about 6.0, and a layer of emulsion of melted lard and acidified water at a pH of about 6.0. The lard layer is clarified and substantially dry, and is removed and separated such as by syphoning. The emulsion and tank water layers, however, contain relatively large amounts of melted lard and are further treated as described above to separate and recover lard, and stickwater suitable for intensive sewage treatment and discharge.

The foregoing process is repeated, however, an effective amount of dilute phosphoric acid is selectively added to the as yet unsettled rendered material, according to the teachings of this invention, so that, upon settling, there is provided a melted lard layer, and an acidified stickwater layer of pH of about 5.7. The melted lard layer is removed by syphoning as a clarified and dry product. The stickwater layer, which contains a small amount of melted lard tailings from syphoning the dry clarified melted lard product, is cleanly separated from the tailings by a single centrifuging in a self-cleaning centrifuge of the type disclosed; lard tailings are recovered thereby as a dry clarified product which is added to the main body of separated lard; the stickwater effluent has a fat content of less than 0.4% by weight and a pH of about 5.8, and is suitable for ordinary sewage treatment.

EXAMPLE 5

The last two procedures of Example 4, above, are repeated; however, acetic acid is used in place of phosphoric acid: Similar results are obtained.

EXAMPLE 6

Beef offal and fat trimmings are chopped into particles of an average diameter of from ½ to ¼ inch, steam rendered and then separated by a scroll centrifuge into a protein solids stream and a fat, water, emulsion and protein fines stream. The fat, water, emulsion and protein fines stream is fed to a centrifuge of the self-cleaning type and is separated into a clarified dry melted fats and oils product, a protein fines sludge containing about 5% fats, 80% water, and 15% protein solids by weight and a stickwater effluent of pH of about 7.5 containing about 50% fats and oils.

The preceding method is repeated, however, enough phosphoric acid is added prior to rendering such that the pH of the stickwater is upon separation, about 6.5. it contains about 47% fats and oils and about 49% water, the remainder being suspended protein fines.

The foregoing procedure is repeated, however, an effective amount of acid is selectively added prior to rendering according to the teachings of this invention such that the pH of the stickwater upon final separation is about 5.0. It contains less than about 0.1% fats, less than about 2% protein fines by weight and water.

EXAMPLE 7

The method of Example 6 is repeated; however, enough acid is added such that the pH of the stickwater effluent is about 4.0. The fat and stickwater are emulsified and substantial processing difficulties are presented, providing very low yields of separable clarified fat and oil product. Repeating this process but adjusting acid addition such that the pH of the stickwater effluent is about 4.2 provides no substantial emulsification or difficulties therefrom with a clarified fat and oil product of good quality and high yield. The stickwater has a fat content of less than about 0.4% by weight.

EXAMPLE 8

With reference to FIG. 2, the reference numeral 1 indicates a suitable apparatus for movement of raw animal, fowl, fish material and the like to a processing system for the recovery of fats and solid materials therefrom. The apparatus 1 may be a suitable conveyor or duct that moves the materials to be treated to a hopper or funnel means 2 that discharges through an inlet 3 of a grinder 4 that grinds and reduces the particle size of the protein and fat containing material.

If the material to be treated is moved from the slaughtering point or other source by water, the apparatus 1 or conveyor may be a duct having a sluice of water and, if the water is not too great a quantity, it would be delivered to the hopper 2 for movement to the grinder 4 substantially in the same manner as the relatively dry state material. If the quantity of water is too great for economical processing, the liquid and solid material would be subjected to a preliminary separation for screening and gravity removal of a portion of the liquid whereby the liquid remaining with the solids would be of such relative quantity as to permit economical processing.

The grinder preferably is of a type that will grind the material in a cold state. If the grinder requires preheating of the material to accomplish the grinding steam is sparged into a flow or stream of the material as in the inlet portion 3 of the grinder 4. This preheating should not be to more than approximately 140° F. to 160° F. and it is preferred that the grinding be in a cold state. The grinder 4 may be a disintegrator or a combination of machines such as a prebreaker followed by a plate grinder. The grinding should be performed in a manner to produce as few very fine particles as possible. High speed impact machinery such as a disintegrator tends to produce some fines and with such a grinder a screen size of one inch diameter holes is preferred. A plate grinder, being low speed equipment tends to cut the material to bits of a predetermined size and avoids production of very fine material. In the case of a plate grinder a hole size of ½" to 1" is preferred although smaller sizes as to ¼" could be used. Production of a large number of fine particles in the grinding stage can result in such particles tending to become encapsulated with fat and the carrying of the fat with the solids on the carrying of the solids into the liquids discharged from a centrifuge separation in the subsequent processing.

The reduced material is discharged from the grinder 4 and flowed in a stream or path 5 to a hopper 6 or the like from which it flows to a pump 7. There may be a slight amount of water accompanying the raw reduced material and this together with the liquids from the said material form a flowable mass that is discharged into the hopper 6. The pump 7 has an outlet 8 communicating with a flow line 9 that extends to the inlet 10 of a scroll type centrifugal separator 11. It is preferred that the feeding of the animal, fowl, or fish material to the grinder and the hoppers 2 and 6 are such that the reduced material from the hopper 6 may be continuously pumped by the pump 7 through the flow line 9.

It is desirable to heat the raw material to reduced the viscosity of the fat and facilitate its passage through cell walls. However, the protein tends to go into solution at high temperatures whereby it might be carried off with the liquids. In the present system the material being processed is heated whereby it is of a temperature of from 180° F. to 205° F. and preferably of approximately 200° F. to 205° F. as it enters the centrifuge 11. The period of time during which the material is at that temperature is substantially at a minimum as the heating is accomplished by sparging steam into the flow line 9 immediately ahead of the centrifuge inlet 10. The steam is supplied to the flow line 9 by temperature responsive steam sparging connection or live steam injection unit 12 with the supply of steam related to the mass of material passing through the flow line 9 whereby said steam raises the temperature of the mass to approximately 200° F. to 205° F. as it enters the inlet 10 of the centrifuge 11.

The centrifuge or centrifugal separator 11 is of a type adapted to separate flowable liquids from heavier solids or semisolids with the centrifuge being operated at a high speed as for example 2000 r.p.m. to 3000 r.p.m. to provide a displacement of the lighter fat in the cells by the heavier water with the separated liquid stream from the centrifuge 11 being continuously released from the liquid outlet 13 for flow through duct or discharge passage 14 as later described. The solids from the centrifuge 11 may contain fibrous material, protein and the like and the heavier solids and semisolids separated from the processed material are discharged in the form of a wet cake as at 15 for delivery to a suitable receiver 16 for furthering processing as later described.

It has been found that the fats tend to become emulsified in the centrifuges and such emulsification interferes with proper separation resulting in excess fat remaining in the protein cake as discharged from the centrifuge 11 and this reduces the fat or oil recovery from the process. In the present system additives are use to reduce the emulsification. Small amounts of suitable salts such as sodium chloride and the like may be added in granular form to the reduced material in the hopper 6 however the quantity added must be kept low as there is a tendency for a residue of such salts to remain in the cake obtained from the centrifuge and the dry meal processed therefrom, and quantities of such salts may not be desirable in some feeds in which the dry meal may be used. The principal additive in the present system is to control the pH of the mass of material delivered to the centrifuge 11. The raw animal, fowl, or fish material usually has a pH of over 6.0 and it has been found that the pH should be below 6.0 to obtain suitable results and above 4.0 in order to prevent adverse effects on the machinery. It is preferred that a suitable acid be dripped from a container 5' into the reduced material in the hopper 6, to mix therewith as it is moved by the pump 7 and discharged into the flow line 9. The quantity of the acid being such that the pH of the liquid mass at it enters the centrifuge 11 is in the range of 4.0 to 6.0 and approximately 5.0 to 5.5. Any suitable acid may be utilized as for example, hydrochloric acid, phosphoric acid, sulfuric acid and particularly the grade sold as muriatic acid due to its lower cost. With such additives and the maintenance of the pH in the specified range there is a reduction in the emulsification of the fat and apparently reduced solubility of the protein or other effect making it easier to separate the protein from the fat.

The flowable or liquid phase of the processed material is discharged through the flow line or discharge passage 14 to a vibrating screen or the like 18 of a screen size approximately 12 to 20 mesh to remove remaining solid or semisolid particles of a sizes which may clog or damage equipment later used in the process. The flowable liquids and very fine solids and semisolids remaining in the liquid which pass through the vibrating by a pump 20 to a three phase centrifuge 21. The material in the flow from the vibrating screen 18 to the three-phase centrifuge 21 preferably has the temperature adjusted so the liquid stream delivered to the centrifuge 21 is approximately 200° F. to 205° F. In the system illustrated the temperature adjustment is by sparging steam into the flow line 19 adjacent the inlet of the centrifuge 21 by temperature responsive steam sparging connection 22.

The three-phase centrifuge 21 is a type wherein the outer face 23 of the bowl 24 therein periodically opens by withdrawing a gate 25 to discharge all bowl contents. The centrifuge 21 is required because even after the various steps of the process above described, heavy solid fines and interfacial solid fines still make up a significant part of the material delivered to the centrifuge 21. The heavy solid fines may tend to clog up a nozzle type centrifuge. More troublesome however, are the interfacial solid fines which tend to collect between the oil and water phase in the bowl and eventually stop oil production. To prevent this the entire bowl contents are periodically discharged at 26 and moved through a suitable duct 27 for delivery to the hopper 6 of the pump 7 for mixture with the incoming raw material to be processed whereby the sludge or solids from the bowl are recycled through the system and any fat remaining therein is removed and the solids collected with the cake that is finally produced. The valuable oil separated from the material centrifuges in the centrifuge 21 is discharged as at 28 and is delivered as by duct 29 to an oil collection or storage 30. A purity control probe 31 is connected to the oil collection point and is arranged whereby if the oil being recovered is not of the desired quality the probe causes the centrifuge 21 to dump its contents. The water which is discharged as at 32 from the centrifuge 21 is usually called "stickwater" and may be discharged to the sewer through a duct 33, however, it is preferable that some of the stickwater be flowed through a flow line 34 for reuse as later described.

The wet cake discharged as at 15 from the centrifuge 11 may contain in the nature of 50% water and up to 5% to 10% fat on a wet basis and it may be desirable to reduce the fat in the cake. In order to obtain a dry meal with a minimum of fat content and to recover the maximum of the fat in the material processed, the wet cake from the centrifuge 11 is delivered from the discharge 15 through a suitable duct or conveyor 35 to a hopper or receiver 16 preferably having an outlet connected to the inlet of a pump 36. Some of the stickwater from the centrifuge 21 is delivered through the flow line 34 to said hopper 16 and mixed with the cake in a sufficient quantity to make same pumpable. This mixture of wet cake and water is then pumped through the pump 36 and flow line 37 to a centrifuge 39 preferably of substantially the same type as the centrifuge 11. Normally both the cake and the stick-water have retained some heat whereby only small additional heating is necessary to raise the temperature of the material to approximately 180° F. to 205° F. and preferably to 200° F. to 205° F. at the inlet 39 of the centrifuge 38. This additional heating to raise the temperature is provided by sparging steam into the flow line 37 adjacent to the inlet 39 as by a temperature responsive steam spraging connection 40. The liquid stream from the centrifuge 38 is continuously released therefrom for flow through a duct 41 to the vibrating screen 18. The solids or wet cake from the centrifuge 38 is discharged as at 42 for delivery to a suitable dryer 43 preferably of a direct fired rotary type drum dryer for drying the solids or cake to a salable condition. It is found that by reprocessing the wet cake from the centrifuge 11 the fat remaining therein may be reduced by from 25% to 50% whereby the percentage of fat remaining in the cake is substantially at a minimum for example, 5% on a dry basis.

With the process as described the raw animal, fowl, or fish material is ground and the pH adjusted and then subjected directly to centrifuging with the addition of heat only just before the stream enters the centrifuge so that the material is only at the process temperature of 200° F. to 205° F. for a few moments after being raised to that temperature. As the phases of the material are quickly separated and discharged and absence of additional heat permits some cooling as the material moves on through the system. The maintenance of the pH tends to reduce the solubility of the protein and controls the emulsion formation thereby facilitating the separation of the fat from the protein and increasing the recovery. The continuous processing and recycling of solids and stickwater results in efficiency such as requirement for small amount of additional heating providing for additional fat recovery and reduction of the fat content of the protein dry cake in an economical efficient process.

In the process of the present invention, fat and oil bearing animal tissues are acidified with an acidic material. Acidification by adding the acidic material may be made at any point or at any combination of points prior to the final separation of a clarified fat and oil product from stickwater. Thus, acidification of the tissues may be made prior to subdividing the tissues into particles; and/or acidification may be made during the subdivision of the tissues; and/or acidification may be made after subdivision of the tissues and prior to heat liberation of the fats and oils from the tissues, commonly known to the art as "rendering"; and/or during the rendering of the fats and oils; and/or after rendering and before or after any other intermediate steps but prior to the final separation of a clarified fat and oil product from stickwater and associated animal tissues.

In general, any material of a sufficient acidic nature may be used to acidify the fat and oil bearing animal tissues to provide a stickwater upon final separation which has a pH from about 4.1 to 5.8. The preferred acidic materials include hydrochloric, sulfuric, phosphoric, citric, tannic, acetic, oxalic, tartaric, malic, formic, lactic and benzoic acids and their water soluble acidic salts. Among these, the most preferred are hydrochloric, sulfuric, phosphoric, citric and acetic acids because of their ready availability, low cost and easy handling properties. Yet other acids and their water soluble acidic salts may be used. Among these are included the more common water soluble organic acidic materials such as the chloroacetic acids, propionic acid and its chlorinated derivatives, their acidic salts and sundry acid anhydrides, etc. Other inorganic acids than those above named may be usefully employed such as nitric acid. The acidic materials may be added as aqueous solutions, or in concentrated form.

What we claim and desire to secure by Letters Patent is:

1. In a process for the recovery of fats and oils from fat and oil bearing animal material comprising the steps of dividing such animal material into particles of from $\frac{1}{32}$ to 2 inches in cross-sectional diameter, rendering said divided mterial to liberate fats and oils therein and to provide a mixture of rendered fats and oils, water, protein and associated tissue, and separating said mixture to provide a separated, clarified fat and oil product, a separated stickwater and a separated protein and associated tissues, the improvement comprising acidifying said material prior to separation such that the separated stickwater has a pH from about 4.1 to 5.8 and a fat and oil content of less than about 0.4% by weight.

2. A process according to claim 1 wherein acidification is conducted prior to the rendering.

3. A process according to claim 1 wherein acidification is effected with an acidic substance selected from the group consisting of hydrochloric, sulfuric, phosphoric, citric, tannic, acetic, oxalic, tartaric, malic, formic, lactic and benzoic acids and their water soluble acidic salts.

4. A process according to claim 3 wherein said acidic substance is hydrochloric acid.

5. A process according to claim 3 wherein said acidic substance is phosphoric acid.

6. A process according to claim 3 wherein said acidic substance is acetic acid.

7. A process according to claim 3 wherein said acidic substance is sulfuric acid.

8. A process according to claim 3 wherein said acidic substance is citric acid.

9. The process of treating raw material from animals, poultry and fish for recovery of protein solids and fats therefrom which consists of, moving raw fat and protein containing material from animal, fowl and fish and subjecting same to grinding to reduce said material and the solids therein to particle size of one-half inch to one inch, moving a stream of said reduced material in a path to a centrifuge separator, introducing an acid into said stream in a quantity to adjust the pH of the reduced material to between 4.0 and 6.0 for retarding emulsification of fats in said reduced material, subjecting the reduced material in said stream to heat adjacent said centrifuge separator to raise the temperature of said reduced material to approximately 180° F. to 205° F. as it enters said centrifuge separator, operating the centrifuge separator to separate said reduced material therein into a flowable liquid phase and a solid phase with a large portion of the fats normally associated with the solids being displaced therefrom and forming part of the liquid phase, said solid phase being a wet cake, and subjecting the liquid phase to a three-phase centrifugation for separating same into fat, water and sludge, and collecting said fat.

10. The process as set forth in claim 9 wherein the heat to which the reduced material is subjected is by introducing steam into said reduced material immediately prior to said material entering said centrifuge separator and the acid introduced into the stream is an acid selected from the group of hydrochloric acid, phosphoric acid and sulfuric acid.

References Cited

UNITED STATES PATENTS

| | | | |
|---|---|---|---|
| 1,456,019 | 5/1923 | Wentworth | 260—412.7 |
| 2,204,703 | 6/1940 | Sanders | 260—112 |
| 2,423,102 | 7/1947 | Keil | 260—412.6 |
| 2,456,684 | 12/1948 | Deatherage | 260—412.7 XR |
| 2,614,110 | 10/1952 | Davis | 233—14 XR |
| 2,684,960 | 7/1956 | Taylor | 260—112 |
| 2,823,214 | 2/1958 | Sharples | 260—412.6 |
| 2,823,215 | 2/1958 | Downing | 260—412.6 XR |
| 3,020,160 | 2/1962 | Downing et al. | 260—412.6 XR |
| 3,046,286 | 7/1962 | Speer et al. | 260—412.6 |
| 3,078,165 | 2/1963 | Alberts | 260—412.6 XR |
| 3,078,287 | 2/1963 | Downing | 260—412.6 |
| 3,171,847 | 3/1965 | Aikins | 260—412.6 |
| 3,204,868 | 9/1965 | Honeychurch | 233—14 |
| 3,222,384 | 12/1965 | Blumberg et al. | 260—412.6 |
| 3,252,961 | 5/1966 | Rodgers et al. | |
| 3,352,841 | 11/1967 | Lyon | 260—412.6 XR |
| 3,352,842 | 11/1967 | Lyon | 260—412.6 XR |

FOREIGN PATENTS 98   1/1874   Great Britain.

OTHER REFERENCES

Vibrans: Jour. Amer. Oil Chem. Soc. (1949), vol. 26, pp. 575–580.

HENRY T. KLINKSIEK, Primary Examiner

U.S. Cl. X.R.

233—14; 260—112